(12) United States Patent
Lee

(10) Patent No.: US 7,993,029 B2
(45) Date of Patent: Aug. 9, 2011

(54) BACKLIGHT MODULE

(75) Inventor: Han-Lung Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 241 days.

(21) Appl. No.: 12/470,473

(22) Filed: May 21, 2009

(65) Prior Publication Data

US 2010/0097782 A1    Apr. 22, 2010

(30) Foreign Application Priority Data

Oct. 21, 2008  (CN) .......................... 2008 1 0305082

(51) Int. Cl.
*F21S 8/00* (2006.01)

(52) U.S. Cl. ....... 362/277; 362/97.1; 362/278; 362/319; 362/320

(58) Field of Classification Search ........ 362/97.1–97.2, 362/253, 277–278, 317, 319–320, 606–607, 362/615–616, 628, 330, 384, 511, 551–552, 362/561, 581; 349/58, 61–63, 65, 162
See application file for complete search history.

*Primary Examiner* — Stephen F Husar
*Assistant Examiner* — Meghan K Dunwiddie
(74) *Attorney, Agent, or Firm* — Raymond J. Chew

(57) ABSTRACT

A backlight module includes a light guide plate and a flexible, looped strip. The light guide plate includes a light emitting surface for emitting light outwardly therefrom. The strip loop includes a brightness enhancement portion and a light-pervious base portion connected end to end. The strip loop is rotatable relative to the light guide plate such that the brightness enhancement portion and the light-pervious base portion can be selectively aligned with and face towards the light emitting surface. The light guide plate is positioned between the brightness enhancement portion and the light-pervious base portion.

12 Claims, 6 Drawing Sheets

BACKLIGHT MODULE

BACKGROUND

1. Technical Field

The present disclosure relates to display devices, and particularly, to a backlight module for a liquid crystal display.

2. Description of Related Art

Liquid crystal display devices have many excellent performance characteristics, such as large-scale information display ability, easy colorization, low power consumption, long lifespan, no pollution associated therewith, and so on. Therefore, liquid crystal display devices are widely used. A typical liquid crystal display device generally includes a backlight module. The backlight module is used to convert linear light sources or point light sources, such as cold cathode ray tubes or light emitting diodes (LEDs, hereinafter), into area light sources with high uniformity and brightness.

Referring to FIG. 6, a typical backlight module 410 includes two light sources 411, a light guide plate 412, a reflective plates 413, a diffusing plate 414, a brightness enhancement plate 415 and a casing 416. The two light sources 411, the light guide plate 412, the reflective plate 413, the diffusing plate 414 and the brightness enhancement plate 415 are installed in the casing 416. The two light sources 411 are positioned adjacent to two opposite light incident surfaces 4121 of the light guide plate 412. The light guide plate 412 includes a bottom surface 4122 and a light emitting surface 4123. The reflective plate 413 is positioned facing towards the bottom surface 4122. The reflective plate 413 is configured for reflecting the light exiting from the bottom surface 4122 back into the light guide plate 412. The brightness enhancement plate 415 and diffusing plate 414 are sequentially positioned one on top of the other adjacent to the light emitting surface 4123. The brightness enhancement plate 415 is configured for improving the brightness of the light transmitted through the light emitting surface 4123. The diffusing plate 414 is configured for diffusing the light transmitting through the brightness enhancement plate 415.

However, the light output from the brightness enhancement plate 415 is usually concentrated on a small region. When the backlight module 410 is applied to a liquid crystal display, this may make the light crystal display have a smaller viewing angle, which is undesirable for the user.

Therefore, a backlight module is needed to overcome the above shortcomings.

BRIEF DESCRIPTION OF THE DRAWINGS

Many aspects of the exemplary backlight module can be better understood with reference to the following drawings. The components in the drawings are not necessarily drawn to scale, the emphasis instead being placed upon clearly illustrating the principles of the present backlight module. Moreover, in the drawings, like reference numerals designate corresponding parts throughout the several views.

DETAILED DESCRIPTION

Reference will now be made to the drawings to describe embodiments of the present backlight module, in detail.

Figure 1:
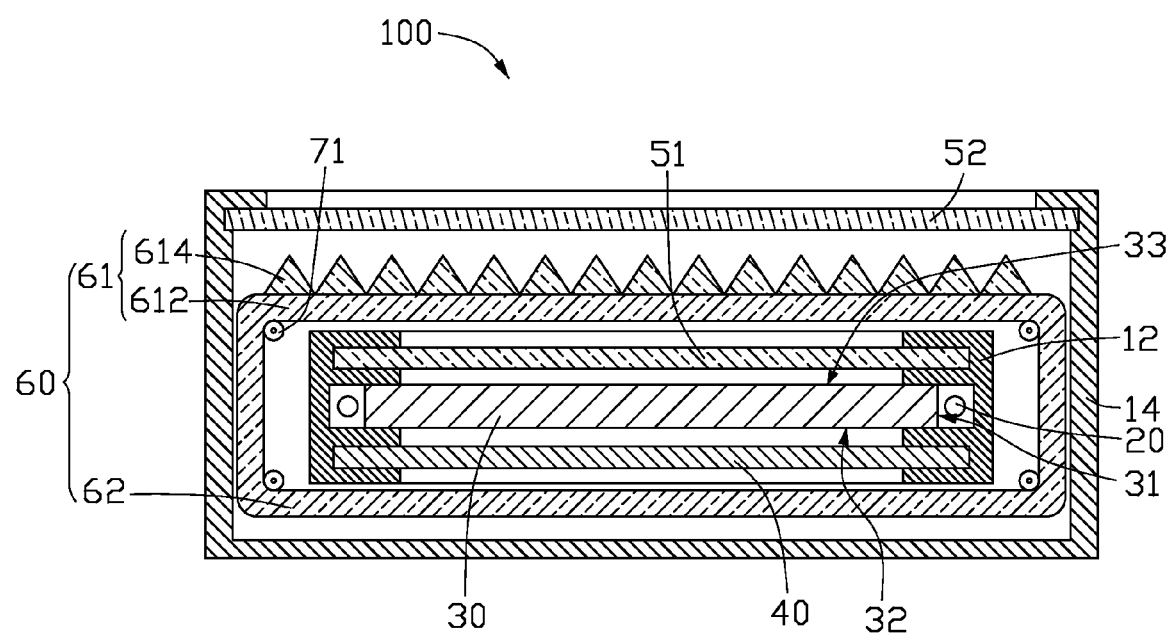
FIG. 1 is a schematic, cross-sectional view of a backlight module in accordance with a first embodiment, the backlight module being in a first state.
Figure 2:
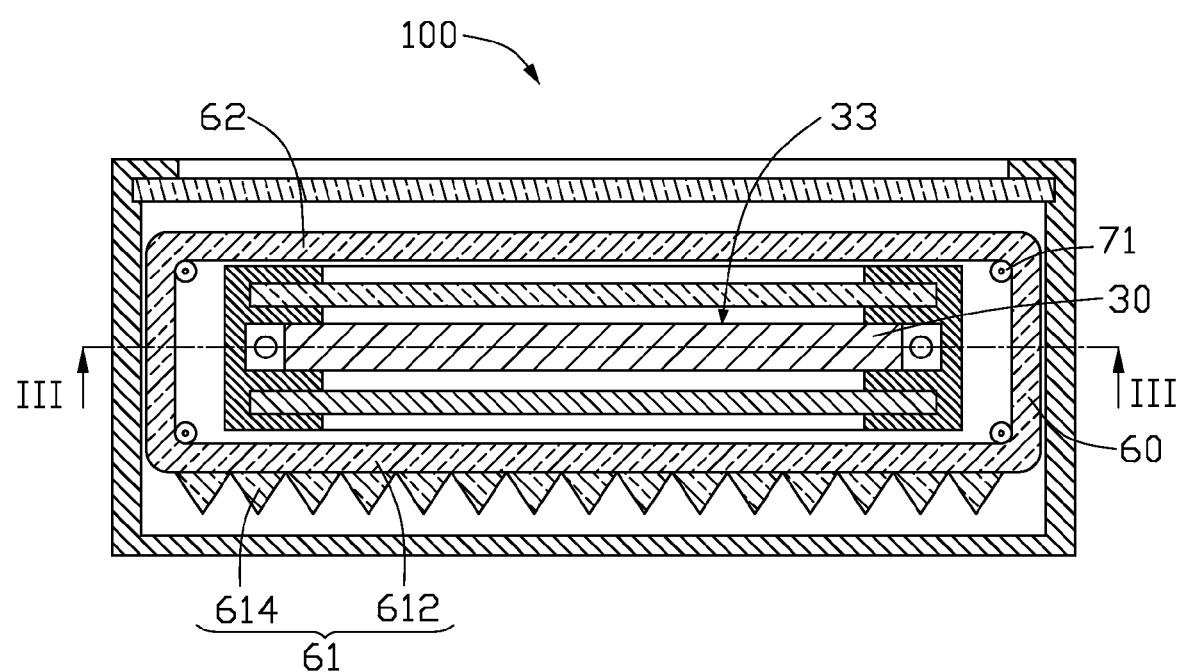
FIG. 2 is a schematic, sectional view of the backlight module of FIG. 1 in a second state.
Figure 3:
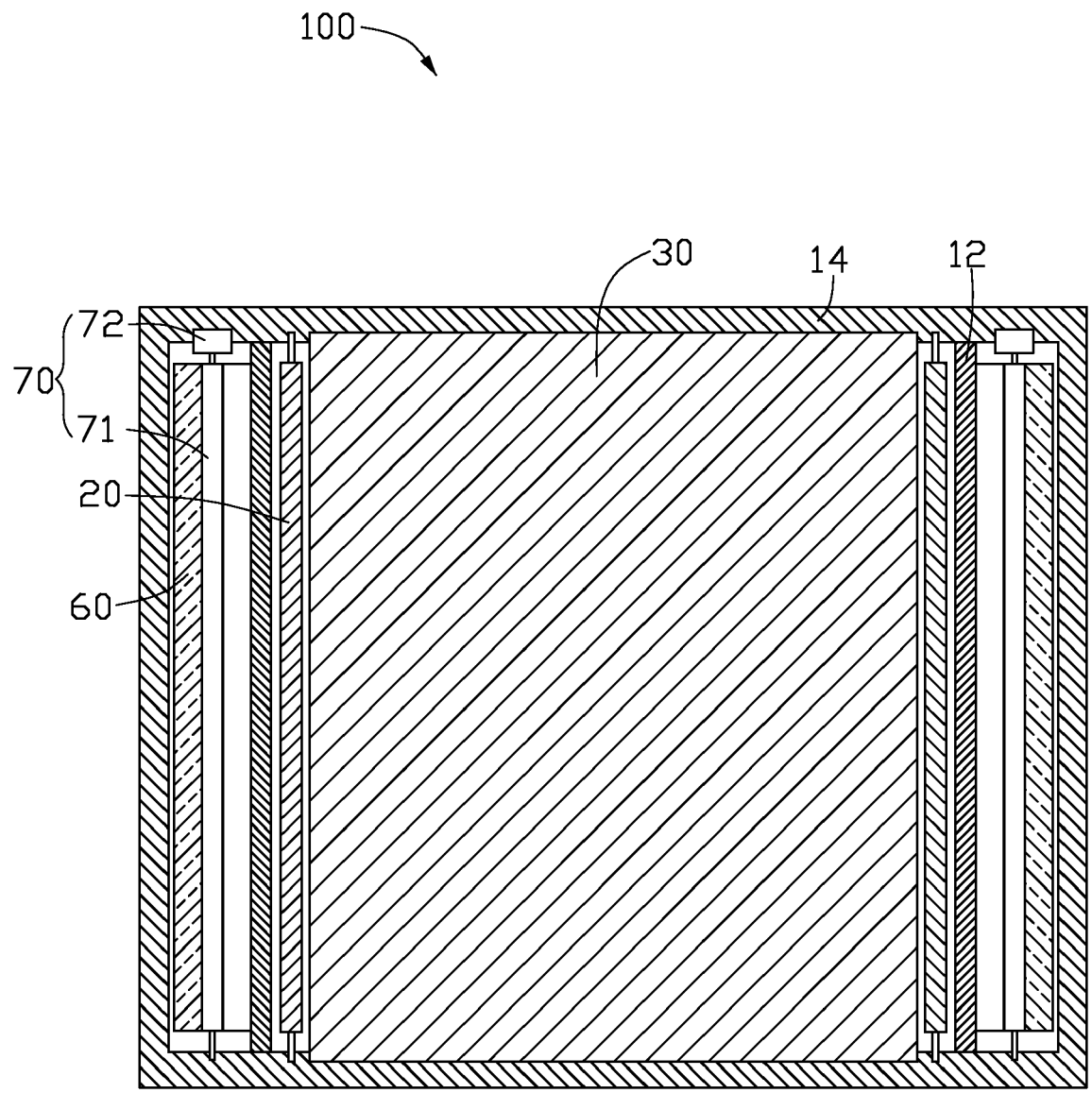
FIG. 3 is a cross-sectional view taken along line III-III of FIG. 2.

Referring to FIGS. 1 to 3, a backlight module 100 in accordance with a first embodiment includes an inner casing 12, an outer casing 14 and a light-pervious, strip loop 60. The inner casing 12 is installed in the outer casing 14. The light-pervious, strip loop 60 is arranged around the inner casing 12. A rotation driving device 70 is provided to drive the light-pervious strip loop 60 to move around the inner casing 12.

The backlight module 100 further includes two light sources 20, a light guide plate 30, a reflective plate 40, and a first diffusing plate 51 mounted in the inner casing 12. The reflective plate 40, the light guide plate 30 and the first diffusing plate 51 are fixed in the inner casing 12 in the above order and arranged in parallel with each other.

The light guide plate 30 has two opposite light incident surfaces 31, a bottom surface 32 adjacent to the two light incident surfaces 31 and a light emitting surface 33 facing away from the bottom surface 32. In this embodiment, the light guide plate 30 is cubic-shaped. The two light sources 20 are positioned in the inner casing 12 and facing toward the two light incident surfaces 31. In this embodiment, the two light sources 20 are installed in the inner casing 12. The light source 20 may be selected from the group consisting of a cold cathode fluorescent lamp and an LED. The light guide plate 30 is configured for converting the light sources 20 into a surface light source.

The reflective plate 40 is positioned facing towards the bottom surface 32 of the light guide plate 30. Light emitted from the light sources 20 is transmitted into the light guide plate 30 through the light incident surface 31. The light transmitted out from the bottom surface 32 is reflected back to the light guide plate 30 by the reflective plate 40.

The first diffusing plate 51 is positioned facing toward the light emitting surface 33. The first diffusing plate 51 is configured for diffusing light exiting from the light emitting surface 33 to make the light uniform.

The strip loop 60 includes a brightness enhancement portion 61 and a first flat, light-pervious base portion 62. The brightness enhancement portion 61 and the first base portion 62 are connected end to end to form a looped strip. The inner casing 12, the light sources 20, the reflective plate 40 and the first diffusing plate 51 are positioned between the brightness enhancement portion 61 and the first base portion 62. Each of the brightness enhancement portion 61 and the first base portion 62 can cover the light emitting surface 33 of the light guide plate 30.

The brightness enhancement portion 61 includes a second flat light-pervious base portion 612 and a plurality of microstructures 614 formed on the second base portion 612 having a brightness enhancement function. In this embodiment, the microstructures 614 are prisms. A cross-section of the microstructure 614 is isosceles triangle. It is to be understood that the microstructures 614 can also be micro lenses having a brightness enhancement function, for example micro hemispherical protrusions, pyramid-shaped protrusions and etc. The base portions 612 and 62 can be made of a flexible, light-pervious material, such as polyethylene terephthalate (PET). A material of the microstructure 614 can be acrylic resin.

The rotation driving device 70 includes four rollers 71 and four motors 72 for driving the rollers 72 to rotate. The four rollers 71 are parallel with each other. The strip loop 60 is looped over the four rollers 71. Two of the four rollers 71 are adjacent to two opposite edges of the light emitting surface 33 and the other two are adjacent to two opposite edges of the bottom surface 32. The four motors 72 are installed in the outer casing 14. One distal end of each of the four rollers 71 are connected with the respective motor 72 and the other is rotatably mounted in the outer casing 14. The outer surfaces of the four rollers 71 tightly contact with the inner surface of the strip loop 60 such that the strip loop 60 can be driven to rotate by the rotation of the four rollers 71. The four motors 72 are configured for driving the four rollers 71 to roll.

The backlight module 100 further includes a second diffusing plate 52. The second diffusing plate 52 is positioned at the lateral side of strip loop 60 and adjacent to the light emitting surface 33 of the light guide plate 30. The second diffusing plate 52 is configured for diffusing the light transmitted through the strip loop 60.

It is to be understood that the number of the motor 72 can be less than four, i.e. at least one, as along as the strip loop 60 can be driven to move by the rotation of the motor 72.

Referring to FIG. 1, the brightness enhancement portion 61 faces toward the light emitting surface 33 of the light guide plate 30. The first base portion 62 faces toward the bottom surface 32. In such case, the light exiting from the light emitting surface 33 transmits through the brightness enhancement portion 61 to the second diffusing plate 52. The light exiting from the second diffusing plate 52 has a high brightness, but focuses on a small view angle. Referring to FIG. 2, the motors 72 drive the rollers 71 to roll, thus drive the strip loop 60 to move along with the rotation of the rollers 71 till the first base portion 62 is moved to align with and face towards the light emitting surface 33. The brightness enhancement portion 61 is moved to align with and face towards the bottom surface 32. In such case, the light exiting from the light emitting surface 33 transmits through the first base portion 62 to the second diffusing plate 52. The light exiting from the second diffusing plate 52 focuses on a large view angle, but has a low brightness.

Figure 4:
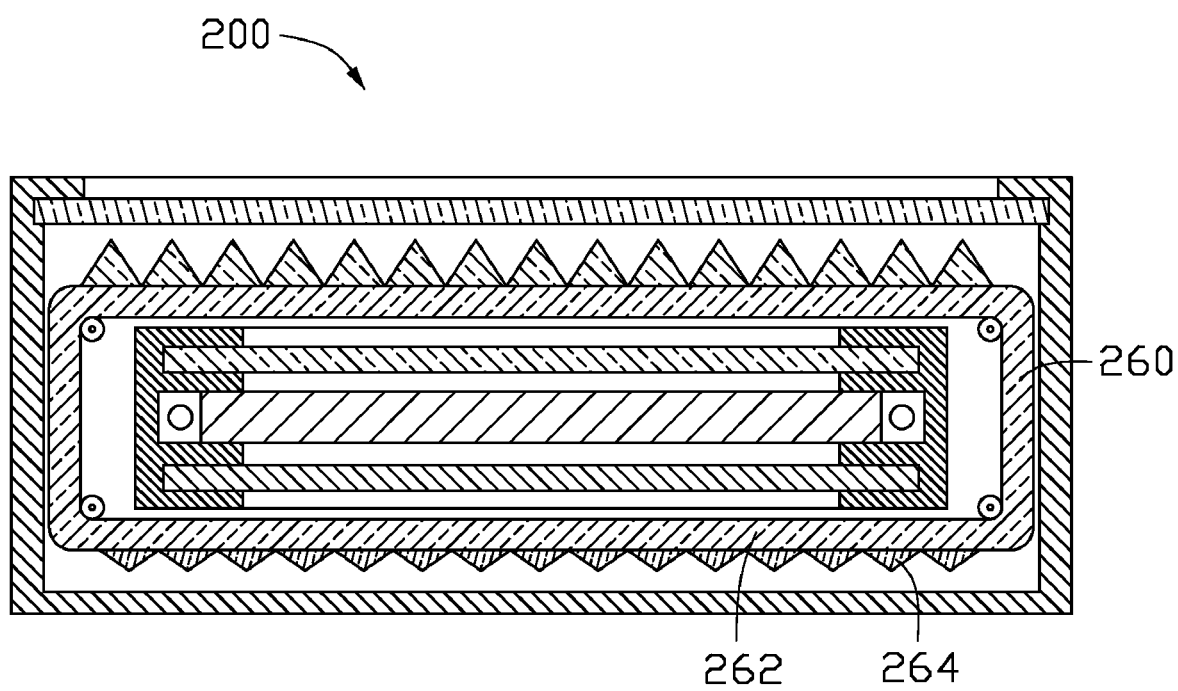
FIG. 4 is a schematic, sectional view of a schematic, sectional view of a backlight module in accordance with a second embodiment.

Referring to FIG. 4, a backlight module 200 in accordance with a second exemplary embodiment is provided. The backlight module 200 is similar to the backlight module 100 of the first exemplary embodiment. The distinguishing features are that the strip loop 260 of the backlight module 200 further includes microstructures 264 formed on the first base portion 262 thereof. In this embodiment, the microstructures 264 are prisms 264. A cross-section of the prism 264 is isosceles triangle. The vertex angle of the isosceles triangle is larger than that of the microstructure 614 of the strip loop 60 in the first embodiment. The prisms 264 can provide a larger view angle of the backlight module 200 than the microstructures 614.

Figure 5:
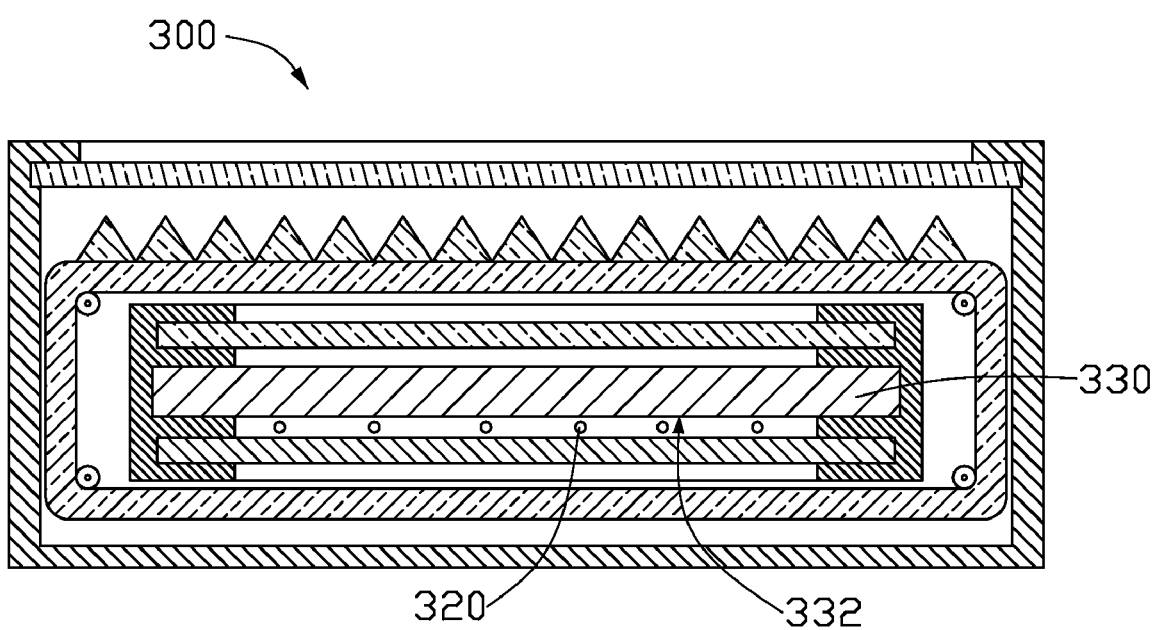
FIG. 5 is a schematic, sectional view of a schematic, sectional view of a backlight module in accordance with a third embodiment.
Figure 6:
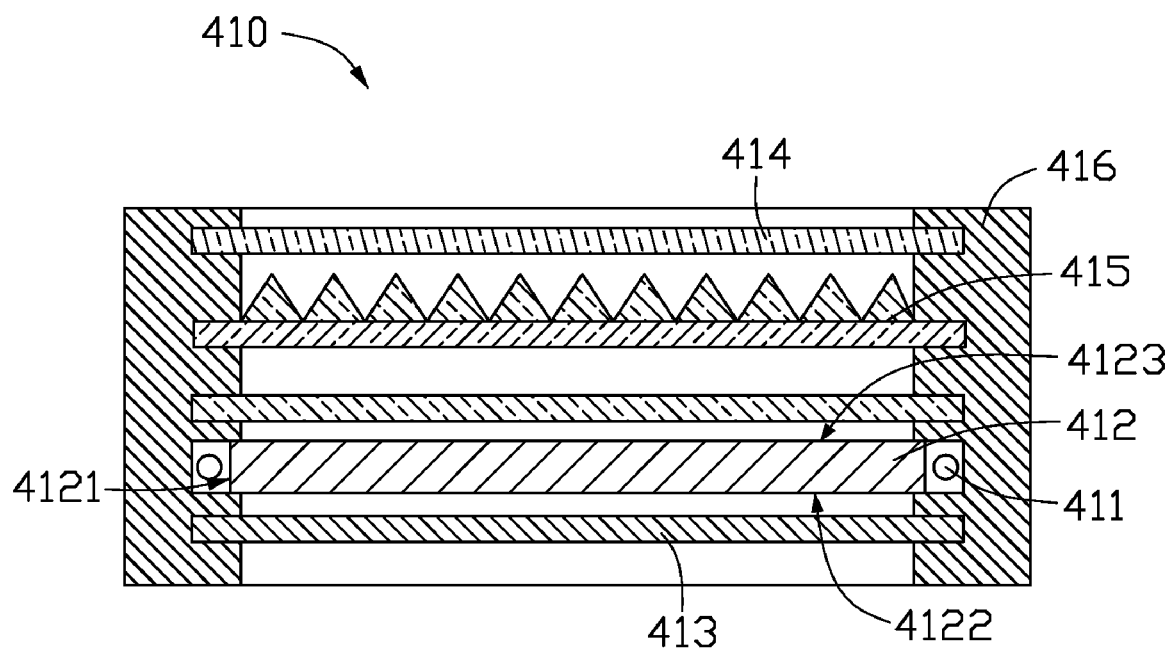
FIG. 6 is a schematic, sectional view of a typical backlight module.

Referring to FIG. 5, a backlight module 300 in accordance with a third exemplary embodiment is provided. The backlight module 300 is similar to the backlight module 100 of the first exemplary embodiment. The distinguishing features are that the number of the light source 320 is more than two and the light sources 320 are positioned facing towards the bottom surface 332 of the light guide plate 330.

The rotation driving device of the above embodiments can drive the strip loop to rotate round the light guide plate. The brightness enhancement portion can be selectively applied facing toward the light emitting surface of the light guide plate, thus the backlight module can have a high brightness or a large view angle.

It is believed that the embodiments and their advantages will be understood from the foregoing description and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A backlight module, comprising:
a light guide plate comprising a light emitting surface for emitting light outwardly therefrom;
a flexible strip loop including a first brightness enhancement portion and a first light-pervious base portion connected end to end, the strip loop being rotatable relative to the light guide plate such that the first brightness enhancement portion and the first light-pervious plate can be selectively aligned with and face towards the light emitting surface, the light guide plate being positioned between the first brightness enhancement portion and the first light-pervious plate.

2. The backlight module of claim 1, further comprising a rotation driving device configured for driving the strip loop to rotate around the light guide plate, the rotation driving device comprising a plurality of rollers and a motor for driving one of the rollers to roll, the rollers being in contact with the inner surface of the strip loop.

3. The backlight module of claim 2, wherein the rollers are parallel with the light emitting surface of the light guide plate.

4. The backlight module of claim 1, further comprising a light diffusing plate facing toward the light emitting surface, the light diffusing plate being positioned between the light emitting surface and the strip loop.

5. The backlight module of claim 1, wherein the light-pervious base portion includes a second brightness enhancement portion having a larger view angle than the first brightness enhancement portion.

6. The backlight module of claim 1, wherein the first brightness enhancement portion comprises a second light-pervious base portion and a plurality of prisms formed thereon, the second light-pervious base portion being flexible.

7. The backlight module of claim 6, wherein a material of the second light-pervious base portion comprises polyethylene terephthalate.

8. The backlight module of claim 6, wherein a material of the prisms comprises acrylic resin.

9. The backlight module of claim 1, wherein the light guide plate comprises a light incident surface adjacent to the light emitting surface, the backlight module further comprising a light source facing toward the light incident surface of the light guide plate.

10. The backlight module of claim 1, wherein the light guide plate comprises a light incident surface facing away from the light emitting surface, the backlight module further comprising a plurality of light sources facing toward the light incident surface of the light guide plate.

11. The backlight module of claim 1, further comprising an inner casing, the light guide plate being mounted in the inner casing, the inner casing being positioned between the first brightness enhancement portion and the first light-pervious base portion.

12. The backlight module of claim 2, further comprising an outer casing, the light guide plate and the strip loop being retained in the outer casing, the motor being mounted in the inner surface of the outer casing, one end of the one of the rollers being connected with the motor.

* * * * *